Figure 1:
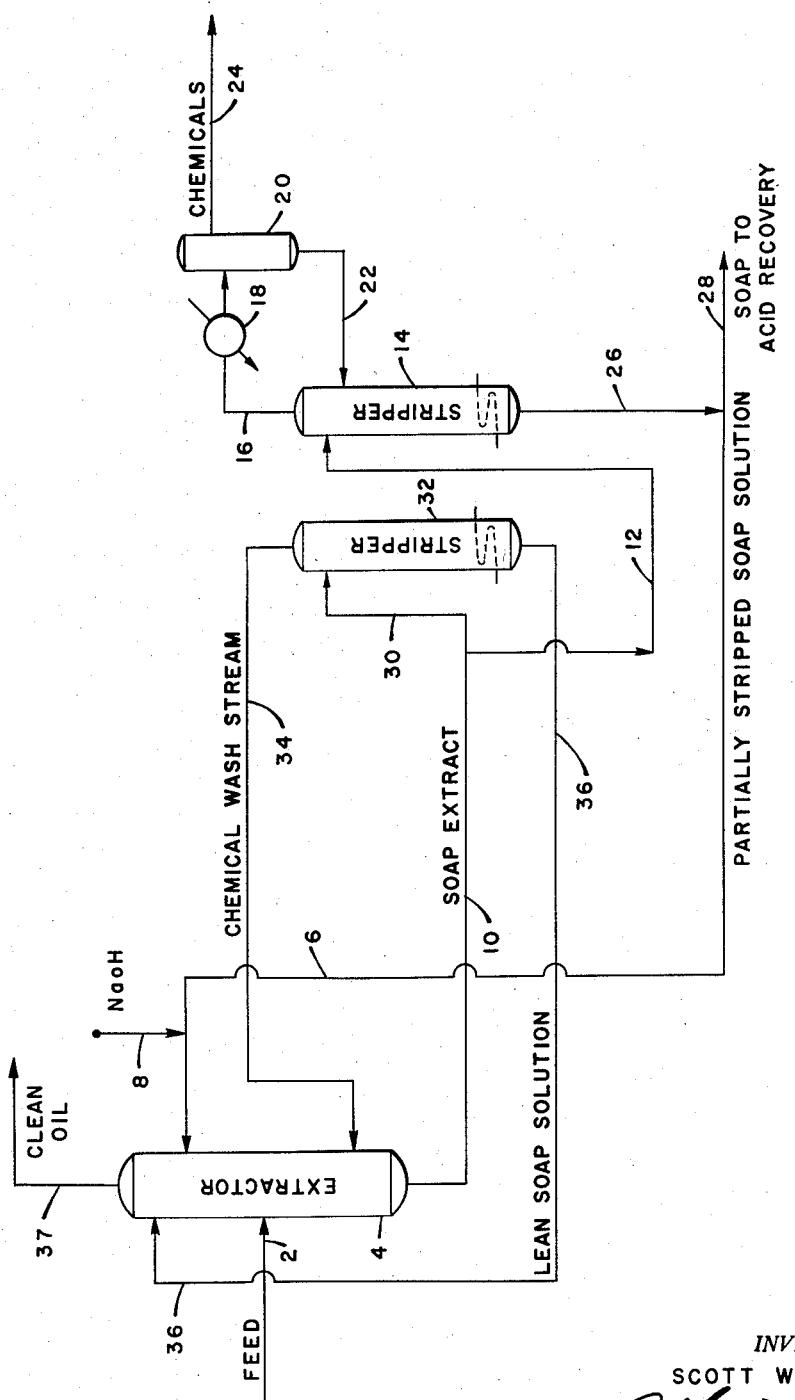

INVENTOR.
SCOTT W. WALKER
ATTORNEY

July 8, 1958 S. W. WALKER 2,842,581
METHOD FOR EXTRACTING OIL-SOLUBLE CHEMICALS
FROM HYDROCARBON SOLUTIONS THEREOF
Filed May 26, 1955 3 Sheets-Sheet 2

INVENTOR.
SCOTT W. WALKER
BY
ATTORNEY

July 8, 1958 S. W. WALKER 2,842,581
METHOD FOR EXTRACTING OIL-SOLUBLE CHEMICALS
FROM HYDROCARBON SOLUTIONS THEREOF
Filed May 26, 1955 3 Sheets-Sheet 3

INVENTOR.
SCOTT W. WALKER
ATTORNEY

United States Patent Office 2,842,581
Patented July 8, 1958

2,842,581

METHOD FOR EXTRACTING OIL-SOLUBLE CHEMICALS FROM HYDROCARBON SOLUTIONS THEREOF

Scott W. Walker, Tulsa, Okla., assignor to Pan American Petroleum Corporation, a corporation of Delaware Application May 26, 1955, Serial No. 511,243

3 Claims. (Cl. 260—450)

The present invention relates to the recovery of oxygenated organic chemicals from hydrocarbon-containing mixtures and to the problems associated therewith. More particularly, it is concerned with the recovery of such chemicals in hydrocarbon mixtures by soap extraction methods and the problems encountered in obtaining said chemicals from the soap extract.

In recovering oil-soluble chemicals from hydrocarbon solutions thereof, such as for example, hydrocarbon solutions of the type produced by the reaction of carbon monoxide with hydrogen at elevated temperatures and pressures in the presence of a fluidized alkali-promoted iron catalyst, it has been proposed that soap solutions of various types be employed as selective solvents or extractants for such chemicals. Generally, these "soap" solutions are not composed of soaps in the true sense, but are made up largely of substantially nonsurface-active salts of alkali metals or their equivalent salts derived from carboxylic acids having an average molecular weight ranging from about 115 to about 135. Soap solutions of this type are most conveniently prepared by adding the required amount of caustic or other suitable base to the primary oil fraction produced in hydrocarbon synthesis whereby the free acids present in said fraction are neutralized. By agitation of the resulting mixture, a substantial portion of the oil-soluble chemicals present therein tend to pass into the lower aqueous layer. Along with the chemicals dissolved in the soap solution, there is usually found from about 5 to 10 weight percent of hydrocarbons solubilized therein. The latter, generally speaking, are undesirable because they tend to impart objectionable characteristics to the chemicals recovered from such solutions. Separation of the hydrocarbons from the chemicals has been a relatively difficult job since the former boil over substantially the same range as the chemicals, making ordinary distillation separation methods of very little value.

In practice, primary oil from hydrocarbon synthesis was first mixed with sufficient caustic to neutralize the free acids in the oil, the resulting soaps forming a lower aqueous phase which separated from the neutral oil. The neutral oil was next extracted with a lean soap solution of the type hereinafter defined and the resulting extract which contained oxygenated chemicals and solubilized hydrocarbons was combined with the chemical-rich soap solution formed in the above-mentioned neutralization step. These combined streams were then subjected to extraction with a light hydrocarbon, hereinafter referred to as "deoiling" or "the deoiling step," such as for example, liquid propane or liquid butane, for the purpose of removing from the soap solution any hydrocarbon dissolved by the soap in the neutralization and extraction steps. The raffinate from this extraction consisted chiefly of an oil-free soap solution containing oil-soluble oxygenated organic chemicals and was thereafter fractionated under pressure to separate any light hydrocarbon solvent present after which the soap solution was stripped free of chemicals in a conventional bubble cap still. The light hydrocarbon extract obtained from the deoiling step contained both high molecular weight hydrocarbons and relatively high molecular weight chemicals, particularly ketones and esters, and was generally sent to a flash drum or to a distillation unit where the butane was removed overhead and returned to the deoiling step. The bottoms from the butane recovery step consisted principally of hydrocarbons and chemicals and was recycled and combined with the neutral oil feed to the soap extraction step.

While a substantial recovery of chemicals is provided by the procedure generally outlined above, the latter possesses at least two definite disadvantages, particularly from the standpoint of continuous operation. First of all, although the soap functioned as a good solvent for the chemicals in the oil, the resulting extract formed within the column tended to carry with it an appreciable quantity of hydrocarbons. In other words, the tendency of hydrocarbons to dissolve in the soap extractant increased as the latter became enriched with respect to chemicals, thus, the necessity of the deoiling step referred to above. Secondly, the raffinate oil flowing from the top of the extractor contained chemicals which, under the extraction conditions provided, resisted recovery by the extractant. It is readily seen that such a recovery process employing substantial volumes of oil and being operated continuously will give rise both to appreciable losses of chemicals in the raffinate oil and to purification problems with respect to the chemicals actually extracted.

Accordingly, it is an object of my invention to provide a method for recovering oxygenated organic chemicals from hydrocarbon solutions thereof by means of a modification of the aforesaid soap extraction method whereby the above-mentioned disadvantages are avoided. It is another object of my invention to effect recovery of chemicals from their hydrocarbon solutions by successively extracting the feed to the extraction column with extractant solutions of varying solvent power. More specifically, it is an object of my invention to extract the crude feed to the extraction column with a solvent having a relatively low extraction power for the chemicals in said feed and thereafter extracting the raffinate from this step with a solvent having a high extraction power or selectivity for chemicals dissolved in the feed. It is another object of my invention to provide novel methods for obtaining and supplying a solvent of high extraction power to the aforesaid extraction process.

Figure 2:
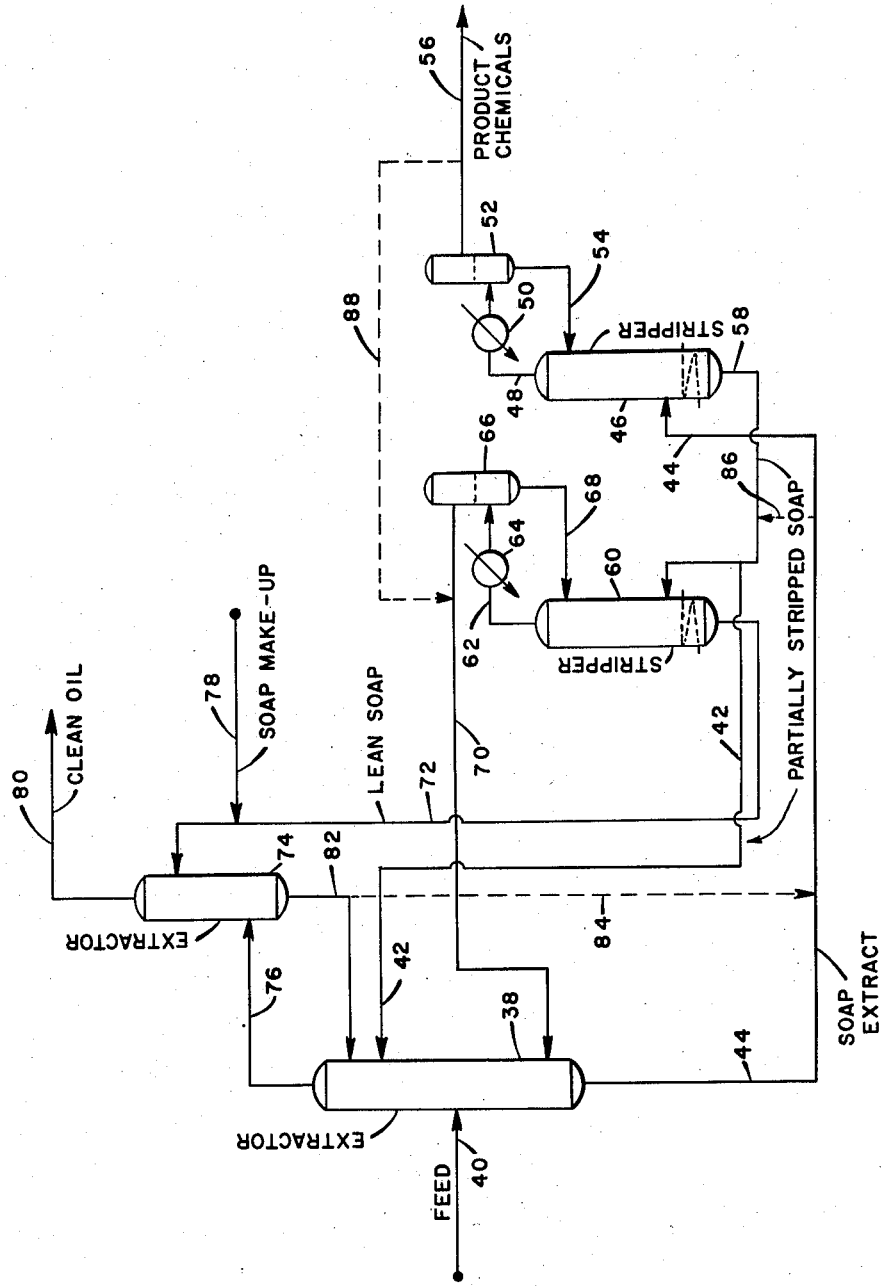
Figure 3:
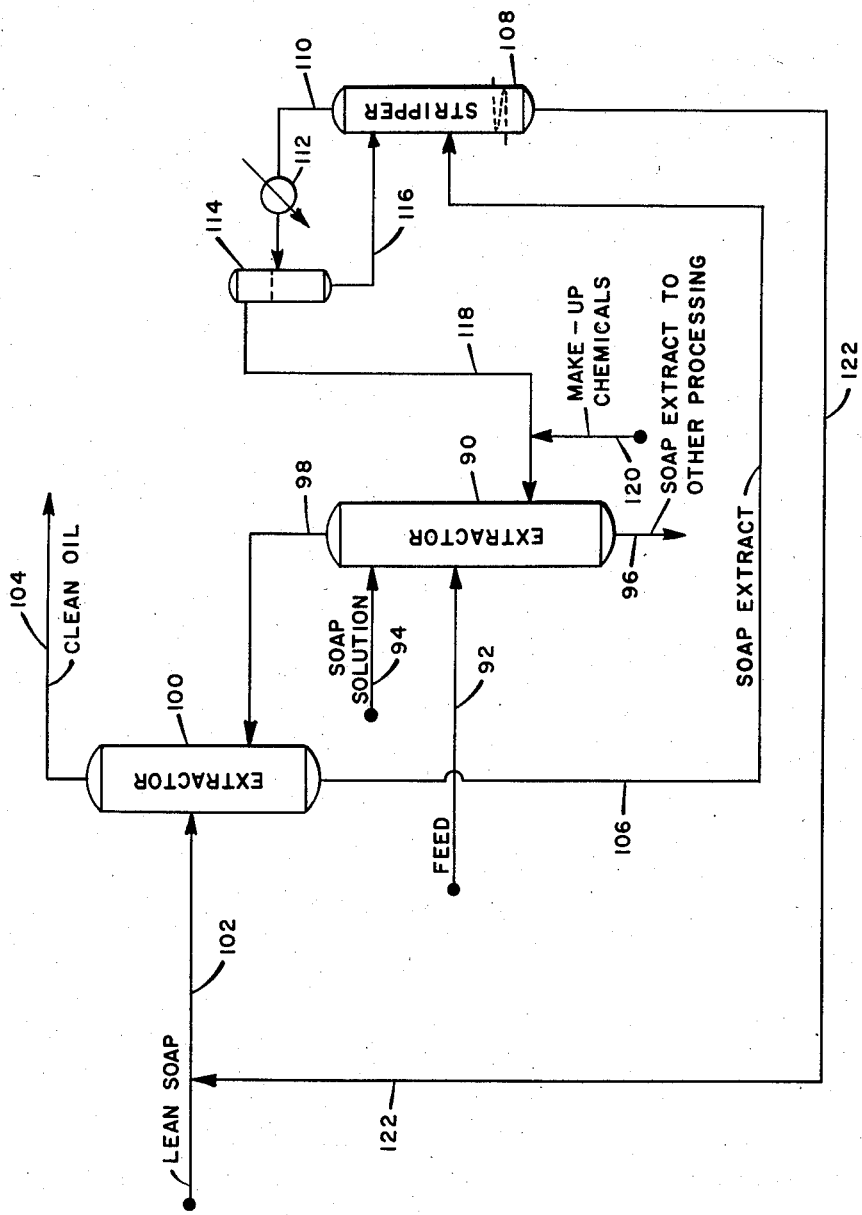

In the accompanying drawings Figure 1 illustrates an embodiment of my invention employing a single extraction zone into which aqueous salt solutions of varying purities are injected into said zone at different levels. In this embodiment there is also shown a system for regeneration of the extractant in which only a minor portion of said extractant is completely regenerated. Figure 2 represents another embodiment of my invention in which two separate extraction zones are employed, while Figure 3 illustrates a method by which lean soap extractant may be continuously supplied to an extraction system in a manner such that the source of extractant is entirely self-sustaining.

In carrying out a preferred embodiment of my invention, raw hydrocarbon synthesis oil is introduced into an intermediate section of an extraction column and is countercurrently contacted with an aqueous 25 to 50 weight percent soap solution derived in a manner more specifically set out below. The resulting extract is withdrawn from the base of the column, a portion of the extract partially stripped to recover overhead a stream of chemicals, together with a small amount of hydrocarbon contaminants, i. e., less than about 5 weight percent. The portion of the extract that is only partially stripped may constitute the bulk of the total. The remainder of the extract is then subjected to more rigorous stripping conditions in order to drive overhead substantially all of the chemicals and hydrocarbons present in that portion.

In continuous operation, the partially stripped extract is returned to the extraction column at a level above the introduction of the feed but below the level at which the more completely stripped or lean soap solution is simultaneously introduced. Under these conditions, the lean soap stream, which is completely free of chemicals, will tend to reach equilibrium with the oil in the extraction column above the level where the partially stripped soap is introduced. The oil emerging from the top of the column after such treatment is found to be essentially free from chemicals.

For a better understanding of my invention, a preferred embodiment thereof is shown in the accompanying flow diagram, Figure 1, in which, for example, raw hydrocarbon synthesis oil is introduced through line 2 into extraction tower 4. This oil stream containing free acids is countercurrently extracted with a partially stripped aqueous soap solution added to the extractor through line 6. The soap solution added at this point preferably contains free alkali injected into the system through line 8. The alkali is suitably added in an amount sufficient to neutralize free acids in the crude feed and to neutralize any acids which might be liberated in subsequent soap stripping steps. The rich soap extract collecting at the base of the tower is withdrawing through line 10 and the principal portion thereof is transferred through line 12 to a stripping column 14 where it is only partially stripped, e. g., approximately 75 weight percent of the chemicals present in the extract are taken off overhead through line 16 and condenser 18 and thereafter collected in separator 20. An aqueous lower layer is refluxed to the column through line 22, while product chemicals are withdrawn through line 24. The bottoms fraction obtained in stripper 14 is withdrawn therefrom by means of line 26 and a volume of soap corresponding to the free acids neutralized in the feed to extractor 4 is withdrawn from the system through line 28 as a net soap make. If desired, acids may be recovered from this stream in a known manner. The bulk of the stream in line 26, however, is taken through line 6 and used in the initial extract phase occurring in the extractor.

A portion of the soap extract in line 10 is diverted through line 30 to stripper 32 where the extract is exhaustively stripped. The portion of the extract thus stripped may be only a minor part of the total. The entire overhead from this operation is preferably taken off through line 34 and returned to a point near the base of extractor 4 whereby conditions are created within the column itself which favor the salting out, so to speak, of the hydrocarbon contaminants present in the soap extract. Chemicals which might tend to pass into the oil phase within the extractor under such conditions are recovered therefrom by being subjected to a plurality of extraction steps in accordance with my invention. The bottoms from stripper 32 consists essentially of a lean aqueous soap solution and is transferred therefrom through line 36 to a point near the top of extractor 4. This lean soap stream, supplied to the extraction column, countercurrently contacts an oil stream which has already been once extracted with a soap solution of lower selectivity for chemicals. By using a stream of clean soap, such as that introduced through line 36, however, the raffinate oil reaches an equilibrium with a chemical-free soap stream. As a result, the chemicals remaining in the raffinate oil after the first extraction step are substantially completely removed therefrom and pass into the soap.

Figure 2 illustrates still another embodiment of my invention wherein a hydrocarbon solution of oil-soluble nonacid chemicals of the type produced in hydrocarbon synthesis is introduced into a primary extractor 38 through line 40. This crude stream is countercurrently extracted with a partially stripped aqueous soap solution added to the extractor through line 42. The rich soap extract collecting at the base of the extractor is withdrawn through line 44 and sent to stripper 46 where it is subjected to a partial stripping operation. Under such conditions, the overhead passing through line 48 and cooled in condenser 50 contains approximately 75 weight percent of the chemicals present in the soap extract fed to stripper 46. This overhead is collected in separator 52 and allowed to stratify into two layers, the lower aqueous layer being refluxed to the stripper through line 54. Product chemicals substantially free of hydrocarbons are withdrawn through line 56. The bottoms from stripper 46 is withdrawn through line 58 and a portion thereof sent to stripper 60 where said bottoms, which consist principally of an aqueous soap solution, together with minor proportions of chemicals and hydrocarbons, is substantially completely stripped. A portion of the bottoms fraction from stripper 46 is taken from line 58 through line 42 and used as the extractant solution in the extraction step employed in primary extractor 38. Overhead vapors from stripper 60 are withdrawn through line 62, cooled in condenser 64 and sent to separator 66 where the products form two layers, the lower aqueous layer being refluxed to the stripper through line 68. The upper organic layer which consists principally of chemicals, together with a smaller quantity of hydrocarbons, is withdrawn from the separator through line 70 and returned to a point near the base of extractor 38 whereby conditions are created within the column itself which favor the salting out of the hydrocarbon contaminants in the soap extract. The bottoms from stripper 60 is withdrawn from line 72 and sent to secondary extractor 74 which is fed through line 76 by the raffinate stream from extractor 38. If necessary, or desirable, a lean soap make-up solution may be added to the system through line 78. By operation of extractor 74 in the manner described, clean oil is taken from the top thereof through line 80, while a soap extract of chemicals, together with a small amount of hydrocarbons, is withdrawn from the bottom through line 82 and sent to the top of extractor 38. As a variation to this method of handling the soap extract from extractor 74, such extract may, if desired, be combined with the extract in line 44 via dotted line 84. Also, after these streams have been combined, a portion of the resulting mixture may be diverted to line 58 through dotted line 86 as feed to stripper 60. Diversion of soap extract through line 86, as mentioned above, however, may occur regardless of whether or not the extracts from extractors 38 and 74 are combined. Also, in the event the volume of chemicals to be furnished extractor 38 through line 70 by withdrawal of a stream from separator 66 is not adequate, chemicals may be supplied from line 56 via dotted line 88.

Figure 3 is a flow diagram illustrating a method by which lean soap extractant may be continuously supplied to an extraction system, such as that shown in Figures 1 and 2, in a manner such that the entire source of extractant, once the process has been initiated, is entirely self-sustaining. Thus a feed of hydrocarbon synthesis oil, consisting of nonacid oxygenated chemicals, is introduced into primary extractor 90 through line 92. It is countercurrently extracted with a partially stripped aqueous soap solution added through line 94. This partially stripped soap may be derived, for example, by any suitable method such as, for instance, the procedure shown in Figure 2. The rich soap extract collecting at the base of the extractor is withdrawn through line 96 and processed in accordance with any of a number of suitable procedures, such as for example, either of the methods shown in Figures 1 and 2. Raffinate from extractor 90 is taken off overhead through line 98 and introduced into secondary extractor 100 where it is countercurrently contacted with a lean aqueous soap solution introduced through line 102. Oil, free of chemicals, is withdrawn through line 104 for further processing, if desired. The extract from this operation is removed through line 106 and sent to stripper 108. The overhead from this stripping operation is taken off through line 110, cooled in condenser 112 and allowed to settle into two layers in separator 114. The lower aqueous layer is refluxed to the stripper through line 116. The upper organic layer consists principally of nonacid chemicals, together with a minor portion of hydrocarbons, and is withdrawn through line 118 by means of which it is returned to a point near the base of extractor 90 whereby conditions are created within the column favoring the salting-out of hydrocarbon contaminants present in the soap extract in this particular region of the extractor. If considered necessary, for favoring breakout of hydrocarbons from the soap extract near the base of the extraction zone in extractor 90, suitable make-up chemicals may be added through line 120. Bottoms from stripper 108, which has been operated under conditions such as to exhaustively strip the soap extract fed through line 106, is withdrawn through line 122 in the form of a lean aqueous soap solution free of chemicals and hydrocarbons and used as extractant in the operation of secondary extractor 100.

While the above description is illustrative of several embodiments of my novel idea involving operating an extraction unit of the aforesaid type, under conditions which provide for a substantially complete removal of chemicals from hydrocarbon solutions, it is apparent that my invention is much broader than such embodiments and, hence, is not limited to the foregoing specific description. For example, although the method shown for regenerating the soap extract is highly advantageous from the standpoint of steam costs, such regeneration may be accomplished in a single tower with obvious modifications.

I claim:

1. In a process for the recovery of oil-soluble oxygenated organic chemicals from a hydrocarbon solution thereof derived from the synthesis of hydrocarbons by the reaction of carbon monoxide with hydrogen in the presence of a catalyst, said process involving introducing said hydrocarbon solution into an extraction zone at an intermediate point thereof and countercurrently contacting said solution with an aqueous lean salt solution of a substantially nonsurface-active salt of a preferentially oil-soluble carboxylic acid to produce a rich salt extract containing said chemicals, and thereafter subjecting said extract to a stripping operation to recover chemicals therefrom, the improvement which comprises subjecting a portion of said extract to a partial stripping operation and returning the resulting salt solution partially depleted with respect to chemicals to said zone at a level above said intermediate point, but below the level at which said aqueous lean salt solution is introduced into said zone, subjecting the remainder of said extract to a stripping operation whereby said extract is rendered substantially free of chemicals to reproduce said aqueous lean salt solution, returning said aqueous lean salt solution thus produced to said zone at a level above that at which said partially stripped solution is introduced but below the upper end of said zone, and withdrawing a raffinate hydrocarbon stream from the upper end of said zone substantially free from chemicals.

2. The process of claim 1 in which the major portion of said extract is only partially stripped.

3. In a process for the recovery of oil-soluble oxygenated organic chemicals from a hydrocarbon solution thereof derived from the synthesis of hydrocarbons by the reaction of carbon monoxide with hydrogen in the presence of a catalyst, said process involving introducing said hydrocarbon solution into an extraction zone at an intermediate point thereof and countercurrently contacting said solution with an aqueous lean salt solution of a substantially nonsurface-active salt of a preferentially oil-soluble carboxylic acid to produce a rich salt extract containing said chemicals, and thereafter subjecting said extract to a stripping operation to recover chemicals therefrom, the improvement which comprises subjecting a major portion of said extract to a partial stripping operation and returning the resulting salt solution partially depleted with respect to chemicals to said zone at a level above said intermediate point, subjecting the remainder of said extract to a stripping operation whereby the remainder of said extract is rendered substantially free of chemicals to reproduce said aqueous lean salt solution, withdrawing overhead from said last-mentioned stripping operation a stream of chemicals and introducing the latter as a backwash stream into said extraction zone at a level below that at which said hydrocarbon solution is introduced but above the base of said zone so that said stream mixes directly with the rich salt extract within said zone whereby a concentration of chemicals in said rich extract with respect to dissolved hydrocarbons is secured, returning said aqueous lean salt solution from said last stripping operation to said zone at a level above that at which said salt solution partially depleted with respect to chemicals is introduced but below the upper end of said zone, and withdrawing a raffinate hydrocarbon stream from the upper end of said zone substantially free from chemicals.

References Cited in the file of this patent

UNITED STATES PATENTS

| | | |
|---|---|---|
| 2,535,069 | Johnson | Dec. 26, 1950 |
| 2,615,912 | Michael | Oct. 28, 1952 |
| 2,645,655 | Pearce | July 14, 1953 |
| 2,702,298 | Caruthers | Feb. 15, 1955 |
| 2,710,831 | Grekel et al. | June 14, 1955 |